(12) United States Patent
Rollet et al.

(10) Patent No.: US 6,338,454 B1
(45) Date of Patent: Jan. 15, 2002

(54) AIRCRAFT FLIGHT CONTROL DEVICE

(75) Inventors: Philippe Alain Rollet, Velaux; Serge Joseph Mezan, Sausset-les-Pins, both of (FR)

(73) Assignee: Eurocopter, Marignane Cedex (FR)

( * ) Notice: Subject to any disclaimer, the term of this patent is extended or adjusted under 35 U.S.C. 154(b) by 0 days.

(21) Appl. No.: 09/572,439

(22) Filed: May 17, 2000

(30) Foreign Application Priority Data

May 18, 1999 (FR) .............................................. 99 06280

(51) Int. Cl.$^7$ .......................... B64C 13/08; B64C 13/16
(52) U.S. Cl. ..................... 244/17.13; 244/177; 244/178; 244/228; 244/230; 701/4; 701/5; 701/8
(58) Field of Search ............................... 244/17.13, 178, 244/228, 230, 177; 701/4, 5, 8

(56) References Cited

U.S. PATENT DOCUMENTS

| | | | |
|---|---|---|---|
| 5,195,700 A | 3/1993 | Fogler, Jr. et al. | 244/17.21 |
| 5,596,499 A | 1/1997 | Glusman et al. | 364/424.06 |
| 5,692,708 A | * 12/1997 | Coleman et al. | 244/178 |
| 6,142,413 A | * 11/2000 | Dequin et al. | 244/17.13 |

FOREIGN PATENT DOCUMENTS

WO 93-05462 3/1993

OTHER PUBLICATIONS

French Novelty Search Report, dated Feb. 11, 2000.

* cited by examiner

*Primary Examiner*—J. Woodrow Eldred
(74) *Attorney, Agent, or Firm*—Stevens, Davis, Miller & Mosher, LLP

(57) ABSTRACT

The present invention relates to a flight control device for an aircraft comprising a control (2) and a means for actuating a controlled member (RP, RQ) to which a command is applied.

According to the invention, said device (1) additionally includes a sensor (E) for determining a second value that is representative of the control executed by the aircraft (He) with respect to the control axis, and second means (M2) which determine:

- as long as the second value is lower than or equal to a reference value, a first trim command that is proportional to the actuation of the control (2); and
- when the second value is higher than the reference value, in addition to a second trim command, a speed command that is proportional to the additional actuation over and above said second value.

7 Claims, 1 Drawing Sheet

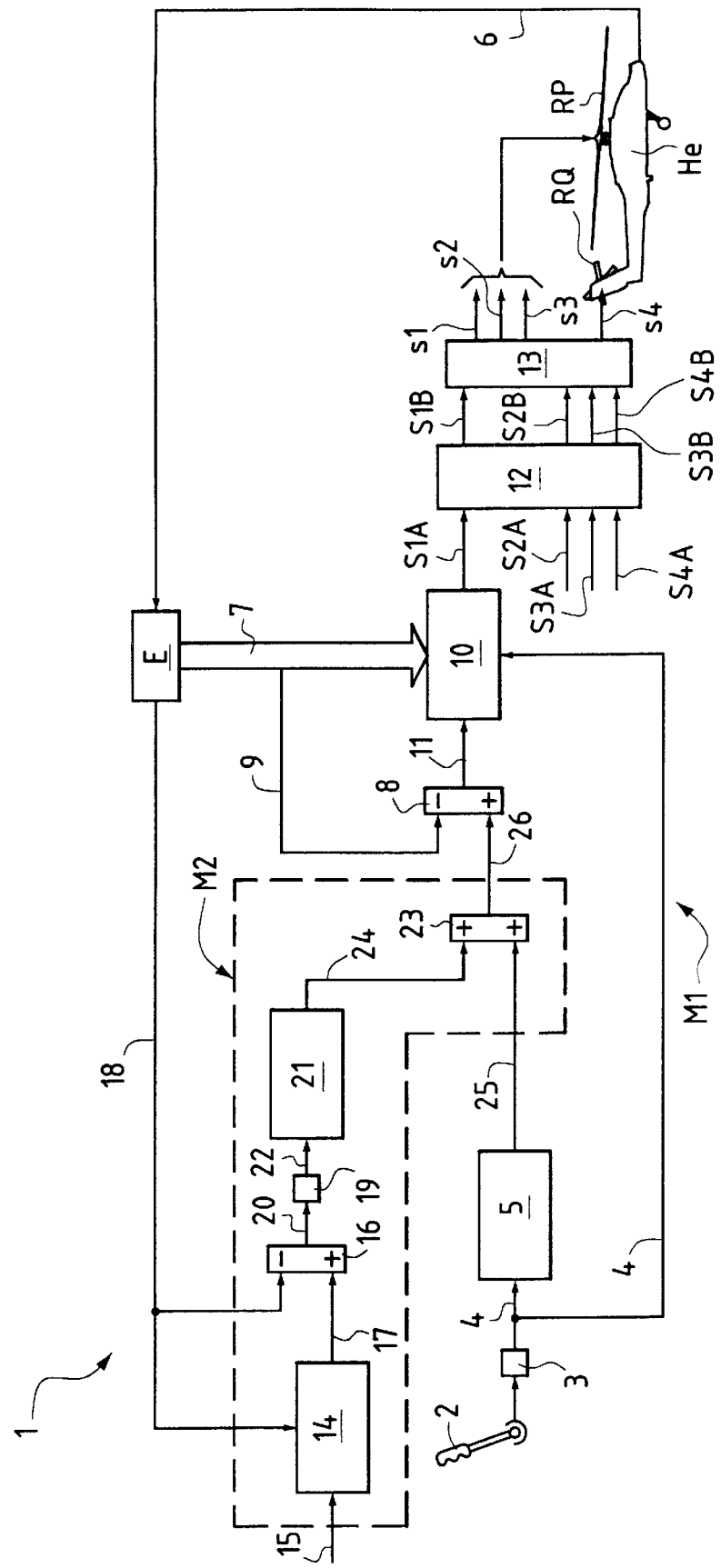

AIRCRAFT FLIGHT CONTROL DEVICE

The present invention relates to a flight control device for an aircraft, particularly a helicopter.

This device which may, in the context of the present invention, be a device of the mechanical or electrical flight controls type, comprises, in the known way, for control with respect to at least one control axis (roll, pitch, yaw):

- at least one control (stick or mini-stick) which can be actuated by a pilot of the aircraft;
- at least one actuating means (servocontrol) for actuating a controlled member (rotor) to which a command is applied; and
- first means for determining and transmitting to the said actuating means a command that is dependent on a first value that represents the actuation of said control.

Although the invention may in principle be applied to any control axis (pitch, yaw, roll) of any type of aircraft, it is explained hereinbelow in greater detail with respect to the roll axis of a helicopter.

It is known that in forward flight, when the pilot of a helicopter actuates the roll control or stick, that is to say moves said stick sideways, the response of the helicopter to this command generally corresponds to an angular roll speed (or rate) which is more or less proportional to this movement. In the context of the present invention, this type of control will be known as "speed control" using a speed command (for example angular roll rate). Said speed command is appropriate to the performing of most conventional flying maneuvers.

In addition, the fact that the stick controls an angular roll rate, rather than an inclination, allows the stick to be kept more or less centered as soon as the desired inclination is achieved, thus improving pilot comfort. Furthermore, the ability to be able to meter the angular speed accurately is appreciable during large-amplitude dynamic maneuvers.

However, it is also known that control of the "trim" type (using trim commands), whereby actuation of the control (in the example being considered, moving the stick sideways) directly brings about a proportional rotation (in the example being considered, a proportional inclination in terms of roll) of the helicopter, is better suited for certain phases of flight than the aforementioned speed control.

In particular:
- on cruising flight on instruments, in poor visibility, control of the trim type makes it possible, when pressure on the stick is released on completion of a rolling maneuver, to return automatically to horizontal trim, which gives the pilot a great feeling of security. Conversely, maintaining constant inclination in order to effect a continuous turn, requires lateral pressure to be kept on the stick, and this in return gives the pilot tactile feedback regarding the inclination and allows him to pay a little less attention to the artificial horizon; and
- for small corrections in heading which consist in banking then straightening out, trim control is intrinsically easier to manage because it requires only a pulse action (impulse) on the stick rather than alternating movements as are necessary for speed control. For precision tasks, such as following an ILS line of approach, this characteristic in particular makes it possible to obtain a more precise path.

However, whatever the control axis considered and whatever the type of aircraft used, it is not possible for the two types of control (control by trim and control by speed) to be employed simultaneously or even combined. In consequence, whichever of these types of control is being used, there are always phases of flight for which the type of control used is hardly appropriate.

The present invention relates to a flight control device (mechanical or electrical) for an aircraft, particularly a helicopter, that makes it possible to overcome these drawbacks.

To this end, according to the invention, said flight control device of the aforementioned type is noteworthy in that it additionally comprises:

- at least one sensor for determining a second value which represents the control executed by the aircraft, with respect to said control axis; and
- second means associated with said first means so as to determine, as commands to be applied to said actuating means:
  - as long as said second value is below or equal to a reference value, a first trim command that is proportional to said first value, said first value being equal to a limit value when said second value is equal to said reference value; and
  - when said second value is higher than said reference value, a second trim command which is proportional to said limit value and a speed command that is proportional to the difference between said first value and said limit value, that is to say proportional to the additional actuation with respect to the actuation that represents said limit value, that allows the aircraft to be brought to the aforementioned reference value.

Thus, by virtue of the invention:
- actuation of the control (for example moving the control stick sideways) generates an aircraft trim command (for example an inclination in terms of roll) that is proportional to this actuation, as far as said reference value;
- beyond this value (the aforementioned roll inclination threshold, for example), the additional actuation of the control gives rise to a speed command (for example an angular roll rate) proportional to this additional actuation, which makes it possible to combine the two types of control (trim and speed) in such a way that each control is active in those areas of flight in which it is the most effective.

In particular, trim control is thus active for small corrections, for example of heading, and speed control is thus active for large-amplitude maneuvers.

In consequence, the device according to the invention makes it possible to combine the advantages of the two types of control. In addition to the aforementioned phases of flight, the invention is also advantageous in tactical flight close to the ground, particularly in poor visibility or by night.

As mentioned previously, the device according to the invention is particularly appropriate to control with respect to the roll axis. However, it may of course also be used (in addition or as an alternative) for control with respect to the pitch and yaw control axes.

In addition, in a particular embodiment, said device comprises controls, actuating means, sensors and first and second means for controlling the aircraft with respect to each of the control axes—roll, pitch and yaw—of the aircraft.

Furthermore, according to the invention, said reference value of the aircraft in terms of roll is adjustable in flight, either by action of the pilot or automatically from information that determines the flight scenario.

The single figure of the drawing allows a good understanding of how the invention may be achieved. This figure is the block diagram of a flight controls device according to the invention.

The device 1 depicted diagrammatically in the figure is mounted on board an aircraft, in this instance a helicopter He to be flown, although, for reasons of clarity of the drawing, the helicopter He is depicted on a smaller scale outside said device 1. The helicopter He comprises at least one main rotor RP intended to provide lift, forward travel and control pitch and roll, and a tail rotor RQ or any other device intended to provide lateral stability and, possibly, yaw control for the helicopter He.

In the known way said device 1 comprises, for control with respect to at least one control axis (roll, pitch, yaw):
- a control 2 (stick or mini-stick) that can be actuated by a pilot of the helicopter HE;
- actuating means (for example servocontrols), not depicted, for actuating controlled members (rotors RP and RQ) to which commands are applied; and
- first means M1 for determining and transmitting to said actuating means commands, particularly a command which is dependent on a first value R1 which represents actuation of said control 2.

In the context of the present invention, the flight controls device may be a device with mechanical controls, so that said first means in particular comprise a linkage and an actuator.

However, in the preferred embodiment depicted in the figure, the device 1 is an electrical flight controls device. Further, said first means M1 comprise, in the known way, for speed control with respect to a control axis (in the example depicted and described hereinabove, this axis will be considered nonlimitingly to be the roll control axis):
- a sensor 3 which detects the position in terms of roll (first value V1) of the (cyclic) stick 2;
- a calculation unit 5 which converts the first value V1 which represents the roll position of the stick 2, received from the sensor 3 by a link 4, into an angular speed control $D\phi co$;
- a set E of sensors mounted on board the helicopter He (as illustrated by a link 6) and delivering (as illustrated by an arrow 7) in the form of electrical signals a number of items of information regarding the status of said helicopter He, such as the air speed, the angular velocities, the angular accelerations, the trim and the loading factors, together with the angular roll rate $D\phi$;
- a calculation unit 8 which calculates the difference $ED\phi$ between, on the one hand, a set point value $D\phi cons$ which depends on the value $D\phi co$ received from the calculation unit 5 and, on the other hand, the value $D\phi$ transmitted by the set E of sensors (by the links 7 and 9). It will be noted that in known flight controls, $D\phi cons$ is equal to $D\phi co$, which is not the case in the improvement according to the present invention, as will be seen hereinbelow:
  - a corrector 10 connected by links 7, 4 and 11 to, respectively, the set E of sensors, the sensor 3 and the calculation unit 8, which is intended to slave $D\phi$ to $D\phi cons$, that is to say to slave to 0 the error signal $ED\phi$ received from the unit 8. This connector 10 also has the task, on the basis of information received from the set E, of ensuring stability and decoupling the axis from the control loop, and incorporates, on the basis of information from the roll control command, a precontrol function for modulating the passband;
  - a unit 12 for decoupling controls which decouples the controls received, in the case of the roll control, by a link S1A and, in the case of the controls for the other axes (pitch, yaw, collective pitch), by the links S2A, S3A and S4A; and
  - a commands mixer 13 which, via links S1B to S4B, receives the commands from the unit 12 and sends out commands via the links s1 to s3 to the servocontrols for the main rotor RP and, via a link s4, to the servocontrol for the tail rotor RQ.

According to the invention, said device 1 additionally comprises:
- at least one sensor incorporated for example into the set E for determining a second value $\phi$ which represents the control executed by the helicopter He with respect to said roll control axis; and
- second means M2 associated with said first means M1 so as to determine, by way of roll commands to be applied to said actuating means:
  - as long as said second value $\phi$ is lower than or equal to a reference value $\phi ref$, a first trim command (for an inclination in terms of roll) that is proportional to said first value V1, said first value V1 being equal to a limit value V1 when said second value $\phi$ is equal to said reference value $\phi ref$; and
  - when said second value $\phi$ is higher than said reference value $\phi ref$, a second trim command proportional to said limit value V1 and a speed command (angular roll rate) proportional to the difference between said first value V1 and said limit value V1, that is to say proportional to the additional actuation that relates to the reference value $\phi ref$.

Thus, by virtue of the invention:
- actuation of the control 2 gives rise to an aircraft trim control (inclination in terms of roll) that is proportional to this actuation, up to said reference value $\phi ref$;
- beyond that value, the additional actuation of the control 2 gives rise to a speed control (angular roll rate) that is proportional to this additional actuation, which makes it possible to combine the two types of control (trim and speed) in such a way that each control is active in the areas of flight in which it is the most effective.

In particular, the trim control is thus active for small corrections, and the speed control is thus active for large-amplitude maneuvers.

In a particular embodiment, said second means M2 comprise:
- a means 14 for determining the reference value $\phi ref$. This value $\phi ref$ may be modified by manual action by an operator or by a pilot or by an automatic action, as illustrated by an arrow 15. The means 14 may, for this purpose, use information and particularly the second value $\phi$, received by a link 18 from the set E of sensors;
- a means 16 calculating the difference $E\phi$ between the second value $\phi$ and the reference value $\phi ref$ received by a link 17;
- a means 19 connected by a link 20 to the means 16, which multiplies the value $E\phi$ by a predetermined gain K to obtain a value $Ec\phi$;
- a limit means 21 receiving this value $Ec\phi$ by a link 22 and limiting said value to a value L if $Ec\phi$ is higher than L. The limiting means 21 thus provides at output a value $Ec\phi 1$ which is equal:
  - to L, if $Ec\phi > L$; and
  - to $Ec\phi$, if $Ec\phi \leq L$; and
- a means 23 which calculates a set point value $D\phi cons$ (set point angular velocity) such that:
  $D\phi cons = Ec\phi 1 + D\phi co$, the values $Ec\phi l$ and $D\phi co$ being received respectively by links 24 and 25.

This set point value $D\phi cons$ is transmitted by a link 26 to the calculation unit 8 which calculates the difference between $D\phi$ and $D\phi cons$, this difference being slaved to 0 by the corrector 10. The corrector 10 thus seeks to obtain the following relationship:

$D\phi = D\phi co + Ec\phi l$.

First of all, according to the invention, when the second value $\phi$ is lower than or equal to the reference value $\phi ref$, that is to say when $Ec\phi$ is not limited ($Ec\phi l = Ec\phi$), the following relationship is had:

$D\phi = D\phi co + K.(\phi ref - \phi)$

This relationship can be written in Laplace notation as ($D\phi = p.\phi$);

$p.\phi = D\phi co + K.(\phi ref - \phi)$ that is to say:

$\phi = (D\phi co/K + \phi ref)/(1 + p/K))$.

Equilibrium therefore gives:

$\phi = D\phi co/K + \phi ref$.

In this case (trim control), a trim discrepancy of amplitude $D\phi co/K$ is kept around the equilibrium trim $\phi ref$.

Secondly, when the second value $\phi$ is higher than the reference value $\phi ref$, that is to say when $Ec\phi$ is limited ($Ec\phi l = L$), the following relationship is had:

$D\phi = D\phi co + L$.

In this case (speed control), an angular velocity (in roll) corrected by the bias L is controlled. Thus, to cancel $D\phi$, the pilot has to position the control 2 in such a way that:

$D\phi co = -L$.

A combination of the aforementioned two instances thus makes it possible to obtain the aforementioned advantages.

The device 1 according to the invention set out hereinabove for roll control may be applied by analogy to control with respect to the other control axes (pitch, roll).

In addition, the present invention can be implemented simultaneously for all the axes or at least for a number of these axes for controlling the helicopter or any other aircraft, particularly a fixed-wing aircraft.

What is claimed is:

1. A flight control device for an aircraft, comprising, for control with respect to at least one control axis:

at least one control which can be actuated by a pilot of the aircraft;

at least one means for actuating a controlled member to which at least one of a trim and a speed command is applied;

first means for determining and transmitting to said actuating means a command which is dependent on a first value that represents actuation of said control;

at least one sensor for determining a second value that represents the control performed by the aircraft with respect to said control axis;

second means associated with said first means so as to determine, by way of commands to be applied to said actuating means:

as long as said second value is below or equal to a reference value, a first trim command that is proportional to said first value, said first value being equal to a limit value when said second value is equal to said reference value; and when said second value is higher than said reference value, a second trim command which is proportional to said limit value and a speed command that is proportional to the difference between said first value and said limit value.

2. The device as claimed in claim 1, wherein said control axis is the roll control axis.

3. The device as claimed in claim 2, wherein said first and second trim commands cause the aircraft to adopt an inclination in terms of roll, and wherein said speed command gives rise to an angular roll rate.

4. The device as claimed in claim 3, wherein said reference value for the aircraft in terms of roll is adjustable in flight.

5. The device as claimed in claim 1, wherein said control axis is the pitch control axis.

6. The device as claimed in claim 1, wherein said control axis is the yaw control axis.

7. The device as claimed in claim 1, and which comprises controls, actuating means, sensors and first and second means for controlling the aircraft with respect to each of the control axes—roll, pitch and yaw—of the aircraft.

* * * * *